US011920406B2

(12) United States Patent
Smith

(10) Patent No.: US 11,920,406 B2
(45) Date of Patent: Mar. 5, 2024

(54) PULL ACROSS ROLL UP SCREEN ASSEMBLY AND METHOD OF ASSEMBLY

(71) Applicant: CENTOR DESIGN PTY LTD, Queensland (AU)

(72) Inventor: Christopher Smith, Queensland (AU)

(73) Assignee: CENTER DESIGN PTY LTD., Queensland (AU)

( * ) Notice: Subject to any disclaimer, the term of this patent is extended or adjusted under 35 U.S.C. 154(b) by 174 days.

(21) Appl. No.: 17/311,947

(22) PCT Filed: Jan. 14, 2020

(86) PCT No.: PCT/AU2020/050016
§ 371 (c)(1),
(2) Date: Jun. 8, 2021

(87) PCT Pub. No.: WO2020/146922
PCT Pub. Date: Jul. 23, 2020

(65) Prior Publication Data

US 2022/0065036 A1 Mar. 3, 2022

(30) Foreign Application Priority Data

Jan. 14, 2019 (AU) ................................ 2019900100

(51) Int. Cl.
*E06B 9/54* (2006.01)
*E06B 9/42* (2006.01)
(Continued)

(52) U.S. Cl.
CPC .................. *E06B 9/54* (2013.01); *E06B 9/42* (2013.01); *E06B 9/58* (2013.01); *E06B 9/78* (2013.01);
(Continued)

(58) Field of Classification Search
CPC ..... E06B 9/42; E06B 9/54; E06B 9/58; E06B 9/78; E06B 2009/543; E06B 2009/583
See application file for complete search history.

(56) References Cited

U.S. PATENT DOCUMENTS 5,456,303 A * 10/1995 Horinouchi ........... E06B 9/0692 160/84.06
10,947,779 B2 * 3/2021 Hummel ................... E06B 9/58
(Continued)

FOREIGN PATENT DOCUMENTS

| | | | |
|---|---|---|---|
| ES | 1055830 | U | 1/2004 |
| WO | 2007068037 | A1 | 6/2007 |
| WO | 2018232439 | A1 | 12/2018 |

OTHER PUBLICATIONS

International Search Report and Written Opinion dated Apr. 3, 2020 for corresponding International Application No. PCT/AU2020/050016.

*Primary Examiner* — Beth A Stephan
(74) *Attorney, Agent, or Firm* — TAROLLI, SUNDHEIM, COVELL & TUMMINO L.L.P.

(57) ABSTRACT

The present invention relates generally to a screen assembly that can be used in a window or door cavity, or any other area which may benefit from the assembly and which contains a flexible sheet like member (for instance an insect screen) wound about substantially vertical rod (for example), which can be pulled across the window or door cavity such that the screen extends and retracts in a horizontal direction and particularly to a system and method allowing more straight-forward installation on site, quickly and easily.

32 Claims, 13 Drawing Sheets

(51) Int. Cl.
*E06B 9/58* (2006.01)
*E06B 9/78* (2006.01)

(52) U.S. Cl.
CPC ... *E06B 2009/543* (2013.01); *E06B 2009/583* (2013.01)

(56) References Cited

U.S. PATENT DOCUMENTS

| | | | | |
|---|---|---|---|---|
| 11,105,148 | B2 * | 8/2021 | Shipman | E06B 9/60 |
| 2001/0042346 | A1 * | 11/2001 | Brioschi | E06B 9/54 49/447 |
| 2007/0029053 | A1 | 2/2007 | Moriya | |
| 2008/0163988 | A1 * | 7/2008 | Hicks | E06B 9/54 160/267.1 |
| 2014/0041814 | A1 * | 2/2014 | Roberts | E06B 9/54 160/271 |
| 2014/0130992 | A1 * | 5/2014 | Clephas | E06B 9/40 160/323.1 |
| 2017/0130527 | A1 * | 5/2017 | Riemelmoser | E06B 9/42 |
| 2018/0313145 | A1 | 11/2018 | De Frene et al. | |
| 2019/0017318 | A1 * | 1/2019 | Smith | E06B 9/42 |
| 2019/0078384 | A1 * | 3/2019 | De Frene | E06B 7/14 |

* cited by examiner

PULL ACROSS ROLL UP SCREEN ASSEMBLY AND METHOD OF ASSEMBLY

RELATED APPLICATIONS

The present application is a U.S. National Stage application under 35 USC 371 of PCT Application Serial No. PCT/AU2020/050016, filed on 14 Jan. 2020; which claims priority from AU Provisional Application No. 2019900100, filed 14 Jan. 2019, the entirety of which are incorporated herein by reference.

TECHNICAL FIELD

The present invention relates generally to a screen assembly that can be used in a window or door cavity, or any other area which may benefit from the assembly and which contains a flexible sheet like member (for instance an insect screen) wound about a substantially vertical rod (for example), which can be pulled across the window or door cavity or other area, such that the screen extends and retracts in a horizontal direction and particularly to a system and method allowing more straightforward installation on site, quickly and easily.

BACKGROUND ART

A previous invention disclosed in WO2007/068037 to the current applicant discloses a screen assembly that comprises a horizontally movable screen (that is the screen that can move across an area) and where the screen can be substantially balanced at a plurality of positions, or at all positions or at substantially all positions, ("balanced" meaning that the screen does not move across the area unless moved by a user).

The balance of the screen at a plurality of positions, or at all positions or at substantially all positions in that previous embodiment was achieved by a special design of some of the components of the screen assembly to enable a "continuous" balance to be achieved, or at least a balance to be achieved at multiple positions of the screen.

The prior art system is illustrated in FIGS. 1 to 6 herein with the forces applied to the various line members or cords in the system illustrated in FIG. 7.

This system worked well, but its complexity and the precision required in assembly required that the manufacturer assemble the screen assembly, balance the screen and deliver the assembled screen assembly to the installation site for installation. This increased the time taken for assembly.

Also, if the balance of the screen assembly was upset for any reason, such as accidental dislodgement of a line member from an upper frustoconical drum of the assembly, for example, the balance will be disrupted and it can be extremely difficult for the installer to rebalance the screen.

It will be clearly understood that, if a prior art publication is referred to herein, this reference does not constitute an admission that the publication forms part of the common general knowledge in the art in Australia or in any other country.

OBJECT OF INVENTION

It is a preferred object of the present invention to provide a pull across roll up screen assembly and method of assembly, which may at least partially overcome at least one of the abovementioned disadvantages and/or provide the consumer with a useful or commercial choice.

SUMMARY OF INVENTION

With the foregoing in view, the present invention in one form, resides broadly in a pull across roll up screen assembly comprising:

a. a flexible screen having a stile located at a front edge area of the flexible screen
b. a substantially vertical supporting member about which the flexible screen can be wound/unwound and having an upper end and a lower end,
c. at least one biasing device associated with the stile to create a tension in the flexible screen,
d. at least one drum associated with the supporting member,
e. a line member that can be wound onto and off the drum, the line member being operatively associated with the stile such that as the flexible screen is extended, the line member is wound onto the drum, and as the flexible screen is retracted, the line member is wound off the drum, the line member being operatively associated with the at least one biasing device using an attachment assembly including:
    i. a line connection device relative to which a portion of the line member is connectable;
    ii. a slide block operatively associated with the at least one biasing device and having a tensioning assembly; and
    iii. an elongate connector mounted relative to the line connection device and configured for selective engagement with the tensioning assembly to tension the line member and thereby tension the flexible screen.

In a second form, the present invention resides in a method for assembling a pull across roll up screen assembly comprising a. a flexible screen having a stile located at a front edge area of the flexible screen
b. a substantially vertical supporting member about which the flexible screen can be wound/unwound and having an upper end and a lower end,
c. at least one biasing device associated with the stile to create a tension in the flexible screen,
d. at least one drum associated with the supporting member,
e. a line member that can be wound onto and off the drum, the line member being operatively associated with the stile such that as the flexible screen is extended, the line member is wound onto the drum, and as the flexible screen is retracted, the line member is wound off the drum, the line member being operatively associated with the at least one biasing device using an attachment assembly including:
    i. a line connection device relative to which a portion of the line member is connectable;
    ii. a slide block operatively associated with the at least one biasing device and having a tensioning assembly; and
    iii. an elongate connector mounted relative to the line connection device and configured for selective engagement with the tensioning assembly to tension the line member and thereby tension the flexible screen;

the method including the steps of pre-tensioning the line member before attachment to the line connection device, attaching the line member to the line connection device, engaging the elongate connector with the tensioning assembly of the slide block to take up any slack in the line member, working the flexible screen to wind and unwind the line member a number of times and adjusting the final tension of the line member by moving the elongate connector relative to the tensioning assembly of the slide block if necessary.

In a third form, the present invention resides in an attachment assembly for the aforementioned pull across roll up screen assembly, the attachment assembly comprising:

- a line connection device relative to which a portion of a line member of the screen assembly is connectable;
- a slide block operatively associated with at least one biasing device of the screen assembly and having a tensioning assembly; and
- an elongate connector mounted relative to the line connection device and configured for selective engagement with the tensioning assembly to tension the line member and thereby tension at least one flexible screen of the screen assembly.

The present invention is directed at providing a screen assembly that comprises a horizontally movable screen (that is the screen that can move across an area) and where the screen can be substantially balanced at a plurality of positions, or at all positions or at substantially all positions, ("balanced" meaning that the screen does not move across the area unless moved by a user) with an attachment assembly allowing the connection of the line members providing the balance in the screen assembly in a quick and simple, but still precise "balanced" manner.

The present invention includes a flexible screen having a stile located at a front edge area of the flexible screen. The flexible screen may be of any type and one or more flexible screens may be provided in a screen assembly. For example, the flexible screen may be a mesh screen or an opaque screen or a combination of a mesh screen and an opaque screen can be provided in the same screen assembly.

The flexible screen will typically be non-resilient and be manufactured from a fabric or polymeric sheet of material. The flexible screen sheet will typically be attached/mounted to the stile at a forward edge area of the screen and also attached to or relative to the supporting member or roll at the opposite edge area.

As mentioned, more than one flexible screen may be provided. If so, the number of flexible screens may extend from both sides of the assembly towards the middle (or another point) and/or more than one flexible screen may extend from the same side of the assembly but spaced apart so as not to obstruct one another as this configuration may allow different screens to be used for example, a mesh screen to prevent the ingress of insects and a parallel but spaced apart opaque screen to minimise light entry through the screen assembly.

The present invention also includes a substantially vertical supporting member about which the flexible screen can be wound/unwound and having an upper end and a lower end. The substantially vertical supporting member is typically configured as a cylindrical member or roll, onto and from which the flexible screen can be wound and unwound as required by the user. Typically, the vertical supporting member will extend substantially the height of the screen, and typically slightly more than the height of the flexible screen member itself. The supporting member is preferably mounted for rotation, typically mounted at an upper end and a lower end.

In use, movement of the stile will typically cause the flexible screen to be wound and unwound, to and from the supporting member via one or more line members associated with the at least one biasing device providing a balancing tension such that force is required on the stile to extend and retract the flexible movement and where no active force is being applied to the stile, the stile will not move and the stile and the flexible screen will remain in position.

The stile is typically located at the front edge area of the flexible screen, the front edge area being the end of the flexible screen which is located toward the midline or opposite end of the screen assembly. The stile will typically be elongate and substantially vertical. Typically, the stile is provided parallel to the supporting member and remains substantially parallel to the supporting member at all times during movement, at least in part due to the one or more line members associated with the at least one biasing device.

Normally the stile will have one or more guides provided at an upper end and/or a lower end in order to guide movement of the stile between the extended and retracted positions.

In a particularly preferred embodiment, the stile is a rigid member with a U-shaped channel provided therein in order to contain components, particularly the components of the attachment assembly. Preferably, the U-shaped channel will be provided on a side of the stile which is opposite to the supporting member but this is a preferred position only. The preferred U-shaped channel will normally be provided with a removable cover which is engageable relative to the U-shaped channel in order to cover any components provided in the U-shaped channel and provide an aesthetically pleasing finish. In other embodiments, the channel provided in the stile can have other shapes to accommodate the components.

The stile can be manufactured of any material, but will normally be a light metal or engineering plastic for example. The stile can have any shape or configuration, but typically, the shape and configuration of the stile is the same over its height or length.

The present invention includes at least one biasing device associated with the stile to create a tension in the flexible screen. Typically, the creation and maintenance of tension in the flexible screen regardless of the position of the stile relative to the supporting member is used to ensure that the flexible screen remains taut and any sagging of the flexible screen is minimised.

Any number of biasing devices can be provided. Typically, at least one is provided and preferably a pair of biasing devices are provided for each stile, one upper biasing device and one lower biasing device. In configuration where more than one biasing device is provided, it is preferred that the biasing devices are provided substantially coaxially relative to the stile and preferably mounted end to end, typically completely within the preferred U-shaped channel provided in the stile. The biasing devices are preferably mounted independently of one another. Preferably, the mount of each of the biasing devices may be able to be moved within the stile in order to adjust the tension which the biasing device exerts.

The biasing devices may have any configuration, preferably a simple spring is used but more complex configurations can be used if required. The provision of a simple spring allows the parameters of the spring (the length, pitch, diameter of material and the like) to determine the tension properties of the spring.

In a preferred embodiment, the at least one biasing device is mounted at least partially, and preferably completely within the preferred U-shaped channel provided in the stile, relative to the centre of the stile. Preferably, one or more mounting blocks is provided relative to the centre of the stile and one end of the at least one biasing device is attached relative to the mounting block.

One or more guides or spacers may be provided relative to the or each biasing device to maintain the or each biasing device in position relative to the preferred U-shaped channel of the stile.

The present invention includes at least one drum associated with the supporting member. At least one drum is provided and preferably a single drum is provided for each flexible screen. Normally, the drum is provided at an upper end of the substantially vertical supporting member typically coaxially with the supporting member and rotating with the supporting member.

A feature of screen assemblies of this type is to "tune" the drum diameter to be about the same as the diameter of the screen about the supporting member. Thus, as the screen is unwound, and the diameter decreases, the diameter of the drum, where the line member is wound onto the drum also decreases, to be about the same diameter. Conversely, as the screen is wound back onto the supporting member, and the diameter increases, the diameter of the drum where the line member is unwound from the drum also increases.

This particular feature enables the screen to be "balanced" at almost every point of extension and retraction which means that a person feels no resistance from the mesh tension at any position during operation of the unit. It also enables the screen material to have considerable tension to minimise sagging.

By "tuning" the diameter of the drum line to the diameter of the screen/supporting member, the forces seem to be quite balanced which means that it is relatively easy to pull the screen across the cavity without feeling an increased pull-back force from the spring, and if the screen is let go, it will stay in position or possibly move only quite slowly.

One way by which the "tuning" can be achieved is to have a drum which has a conical shape, or where part of the drum has a conical shape, such that as the line member is wound onto, or off the drum, the diameter at the position where the line member contacts the drum will vary, and by designing a conical shape with regard to the diameter of the retracted screen, it is possible to have the two diameters to be approximately the same at all times.

Another advantage of the present invention is that by varying the shape of the drum, the operation of the screen can be varied. Thus, rather than needing to completely redesign the assembly for each use, it may be possible to do so by changing the drum.

The drum may have a simple conical profile, or a more complicated profile which may have cone shaped portions which may diverge or converge, cylindrical portions, other shapes, combination of shapes and the like. This may allow the screen to have places where the screen is "balanced" and other positions where the screen can slowly open or close; places where the screen may have increased or decreased tension as the screen is moved and the like.

As examples, the drum may comprise multiple cylinders of different diameters to provide a "stepped" profile, or a tapered cone at either end optionally with a short parallel portion at or adjacent the centre, the shape of a "reverse barrel", or substantially cylindrical. It should be appreciated that these are examples only of the drum and it is not considered that the invention should be limited only to these examples.

Typically, the drum will be attached to, or relative to one end of the supporting member, and it is preferred that the drum is attached to, or relative to an upper end of the supporting member. It is also preferred that the drum tapers from a larger diameter closest to the supporting member, to a smaller diameter further away from the supporting member, although this can be reversed if desired.

The present invention includes a line member that can be wound onto and off the drum, the line member being operatively associated with the stile such that as the flexible screen is extended, the line member is wound onto the drum and as the flexible screen is retracted the line members went off the drum. The line member is also operatively associated with the at least one biasing device using an attachment assembly.

Typically, more than one line member will be provided in the screen assembly of a preferred form of the present invention. Preferably, a first line member is provided to be wound onto and off the drum and at least one, and preferably a number of other line members and/or line portions are provided in order to balance the flexible screen.

At least one line member is preferably operatively attached relative to the at least one biasing device. In a preferred form in which a pair of biasing devices are provided, a line member will preferably be attached at an upper end of an upper biasing device and a line member will preferably be attached at a lower end of the lower biasing device.

As mentioned above, a number of line members may be provided in the screen assembly of a preferred embodiment including a first line member to be wound onto and off the drum and possibly one or more other line members to attach respectively to the or each of the biasing devices. In a particularly preferred embodiment, the first line member which is wound onto and off the drum extends to a joiner block, a second line member extends from the joiner block to the preferred upper biasing device and a third line member extends from the joiner block to the preferred lower biasing device. The line members may extend about one or more wheels or pulleys in order to change direction and be provided about the edge of the flexible screen.

An attachment assembly is preferably provided to attach each line member relative to the respective biasing device. The number of attachment assemblies provided in any screen assembly will typically depend upon the configuration of the screen assembly. In a single stile screen assembly with a pair of biasing devices, a pair of attachment assemblies is preferably provided, one in respect of the upper biasing device and one in respect of the lower biasing device.

The or each preferred attachment assembly includes a line connection device relative to which a portion of the line member is connectable. Preferably, the line connection device is located within the preferred U-shaped channel of the stile. Typically, the line connection device is configured as a body located completely within the preferred U-shaped channel of the stile and a cover which is detachably connected relative to the body. Removal of the cover from the body will typically allow access to the body to attach and detach the line member. An appropriate connection mechanism is provided to allow the connection of the line member relative to the line connection device. Any connection mechanism may be used for example a crimping mechanism, a clamping mechanism or a pin and slot mechanism or the like. A simple and direct connection mechanism is preferred for ease and speed of assembly.

The elongate connector is preferably mounted relative to the line connection device. Again, any connection mechanism can be used to connect the elongate connector to the line connection device. In one form, the elongate connector may be provided with an enlarged portion which is received in or relative to a corresponding receiving portion of the line connection device allowing the elongate connector to extend toward the slide block of the attachment assembly. Attachment of the cover relative to the body of the line connection device will typically sandwich the enlarged portion, fixing its position relative to the line connection device. This relatively simple connection mechanism will allow removal and/or replacement of the elongate connector if necessary.

The line connection device may be made of any material and typically a light metal or engineering plastic will be used.

The line connection device may be mounted relative to the stile movably or be fixed in position. If the line connection device is movably mounted, it is preferred that only linear movement is possible relative to the stile.

The attachment assembly of the present invention includes a slide block operatively associated with the at least one biasing device and having a tensioning assembly. The slide block may be mounted relative to the stile removably or be fixed in position. If the slide block is movably mounted, it is preferred that only linear movement is possible relative to the stile and all other movement restricted or substantially prevented. In a preferred configuration, the slide block will be mounted for movement relative to the stile and movement of the slide block will act to extend or compress the preferred biasing device relative to which the slide block is mounted.

The slide block is operatively associated with at least one, and typically a respective biasing device, with the biasing device typically being attached to or relative to the slide block. Typically, an outer end (the top end of the upper biasing device or the lower end of the lower biasing device respectively) will preferably be attached directly to a respective slide block.

In a preferred configuration, each slide block has a body allowing attachment of the biasing device relative thereto and which also allows the attachment or mounting of the elongate connector, preferably through provision of the elongate connector engagement head.

In a preferred configuration, the elongate connector engagement head is located at least partially within the body of the slide block in order to be located completely within the preferred U-shaped channel of the stile.

The body of the slide block is preferably generally rectangular. The body of the slide block will preferably have an opening provided at one end facing the line connection device, the opening through which the elongate connector is fed during attachment of the elongate connector to the slide block. Preferably, the opening is provided adjacent to the elongate connector engagement head.

The elongate connector engagement head is preferably provided with at least one engagement shoulder. The engagement shoulder is typically biased into engagement with an elongate connector when the elongate connector is inserted into the engagement head. This biasing can be achieved in many ways, but one simple way is to provide the engagement shoulder extending into an opening through which the elongate connector is inserted such that the engagement shoulder is depressed or moved by the dimension of the elongate connector as the elongate connector is inserted.

The engagement shoulder is provided in such a way that the engagement shoulder may be released against the bias through an application of force. The force can be applied to move the engagement shoulder either manually and/or using a tool, either directly or indirectly. In this way, the engagement shoulder can typically be released from the elongate connector to allow removal or release of the elongate connector from the engagement head allowing the elongate connector to move in a forward direction to be engaged by the engagement shoulder but also allowing movement of the elongate connector in the reverse direction once the engagement shoulder has been disengaged.

In a preferred form, the engagement shoulder is formed at the apex of a pair of walls which are angled relative to one another. Preferably the engagement shoulder extends across the width of the elongate connector or at least the width of the engagement formations provided on the elongate connector.

In use, the engagement between the slide block and the elongate connector will create the tensioning assembly allowing a user to exert tension on the flexible screen via the line member and the biasing device associated with the slide block.

The attachment assembly also includes an elongate connector mounted relative to the line connection device and configured for selective engagement with the tensioning assembly to tension the line member and thereby tension the flexible screen. The elongate connector will of course be elongate and preferably include a substantially planar portion to engage with the engagement head. It is preferred that the elongate connector be flexible but the elongate connector will preferably not be resilient. In some embodiments, the elongate connector may be resilient but have limits to that resiliency to provide a buffering effect but also to maintain tension in the flexible screen.

The elongate connector typically has a plurality of engagement formations to engage with the engagement head. Preferably as the elongate connector is drawn through the engagement head, the engagement shoulder will engage respective engagement formations to exert or adjust the tension in the flexible screen.

Although the engagement formations may have any form, is preferred that the engagement formations be or include a number of spaced apart ridges with which the engagement shoulder can engage as required. The spaced apart ridges are typically spaced over at least a portion of the length of the elongate connector.

A gripping portion may be provided at the forward end of the elongate connector. A forward end of the elongate connector may be tapered in order to ease insertion or alignment of the elongate connector with the engagement head. An opening may be provided in the forward end of the elongate connector to allow a user to insert a finger for example to pull the elongate connector through the engagement head.

The elongate connector may be provided with one or more alignment markings or configurations.

One or more corresponding alignment markings or configurations may be provided on the stile. The alignment markings or configurations provided on the stile may have any configuration, but it is preferred that indentations or similar are provided on the stile because markings provided on the stile may be accidentally removed through rubbing, for example. The alignment markings or configurations provided on the elongate connector and the corresponding alignment markings or configurations provided on stile are preferably used during the pre-tensioning step during assembly.

Any of the features described herein can be combined in any combination with any one or more of the other features described herein within the scope of the invention.

Further forms and/or features of the present invention will become apparent from the following Detailed Description.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

According to a particularly preferred embodiment of the present invention, a pull across roll up screen assembly and method of assembly is provided.

The pull across roll up screen assembly illustrated comprises a flexible screen having a stile located at a front edge area of the flexible screen, a substantially vertical supporting member about which the flexible screen can be wound/unwound and having an upper end and a lower end, at least one biasing device associated with the stile to create a tension in the flexible screen, at least one drum associated with the supporting member, a line member that can be wound onto and off the drum, the line member being operatively associated with the stile such that as the flexible screen is extended, the line member is wound onto the drum, and as the flexible screen is retracted, the line member is wound off the drum, the line member being operatively associated with the at least one biasing device using an attachment assembly including a line connection device relative to which a portion of the line member is connectable, a slide block operatively associated with the at least one biasing device and having a tensioning assembly and an elongate connector mounted relative to the line connection device and configured for selective engagement with the tensioning assembly to tension the line member and thereby tension the flexible screen.

Figure 1:
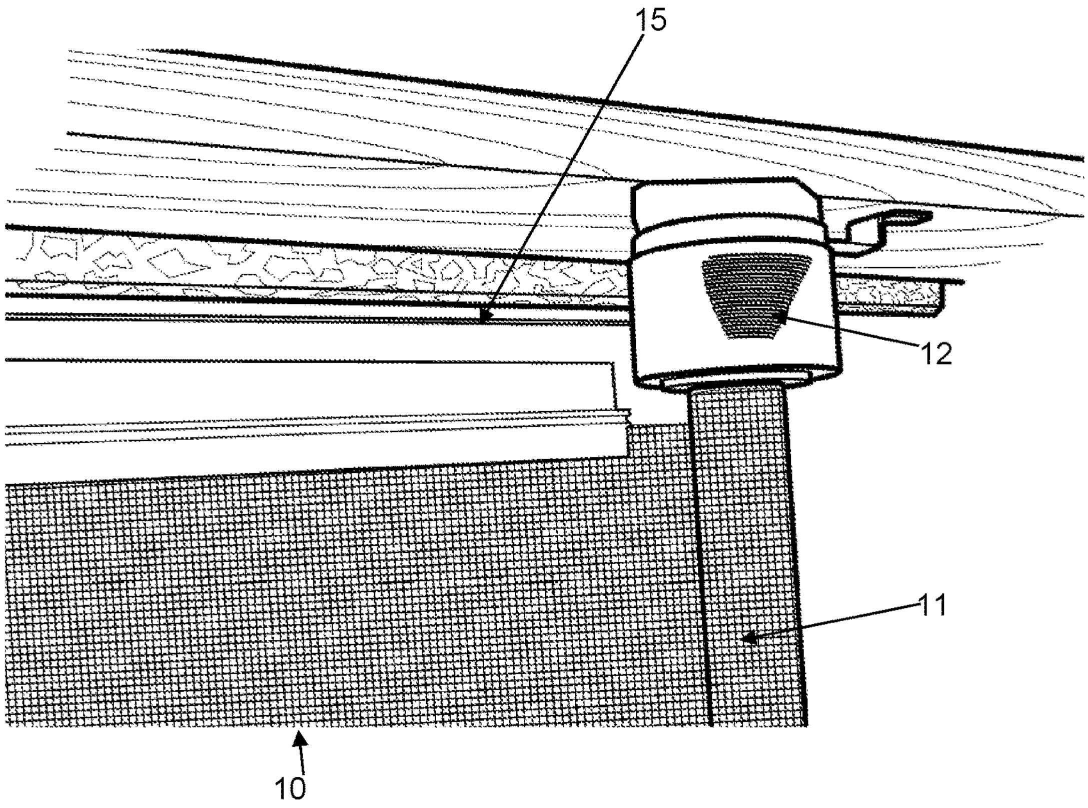
FIG. 1 shows an upper portion of a prior art screen assembly particularly illustrating the drum and the screen fully extended.
Figure 2:
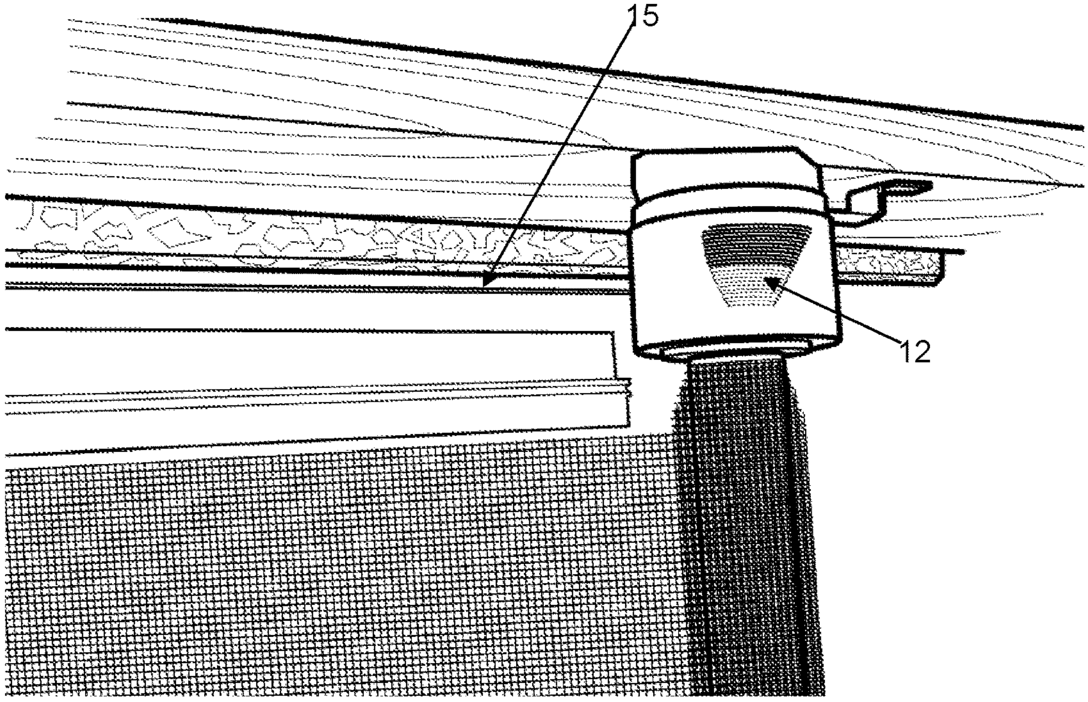
FIG. 2 shows the configuration illustrated in FIG. 1, with the screen partially extended.
Figure 3:
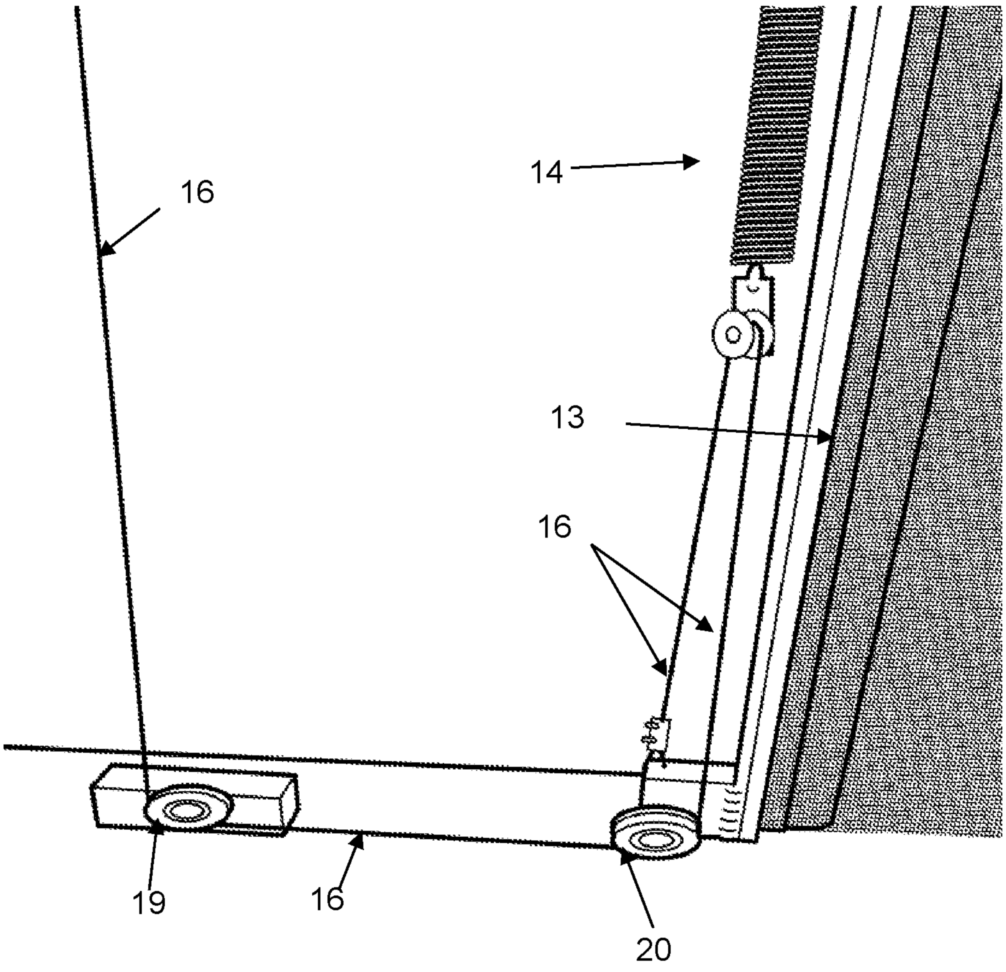
FIG. 3 shows a lower portion of a front edge of the screen illustrated in FIG. 1 particularly illustrating a third pulley, a fourth pulley and a lower end of a biasing means (the housing being removed on the stile at the front edge of the screen for clarity).
Figure 4:
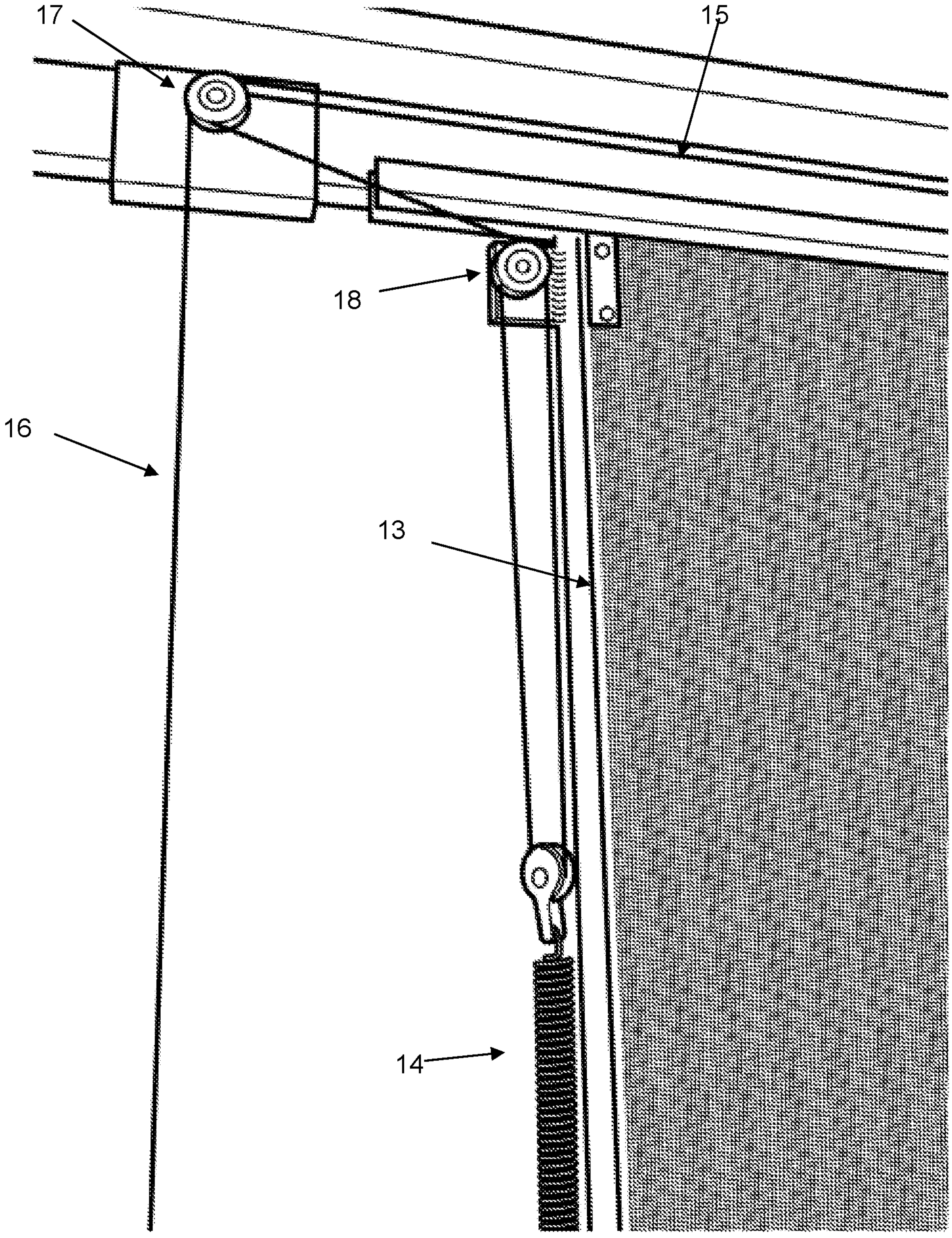
FIG. 4 shows an upper portion of the front edge of the screen illustrated in FIG. 1 particularly illustrating a first return pulley and a second pulley and an upper part of the biasing means which is adjacent to the front edge of the screen.
Figure 5:
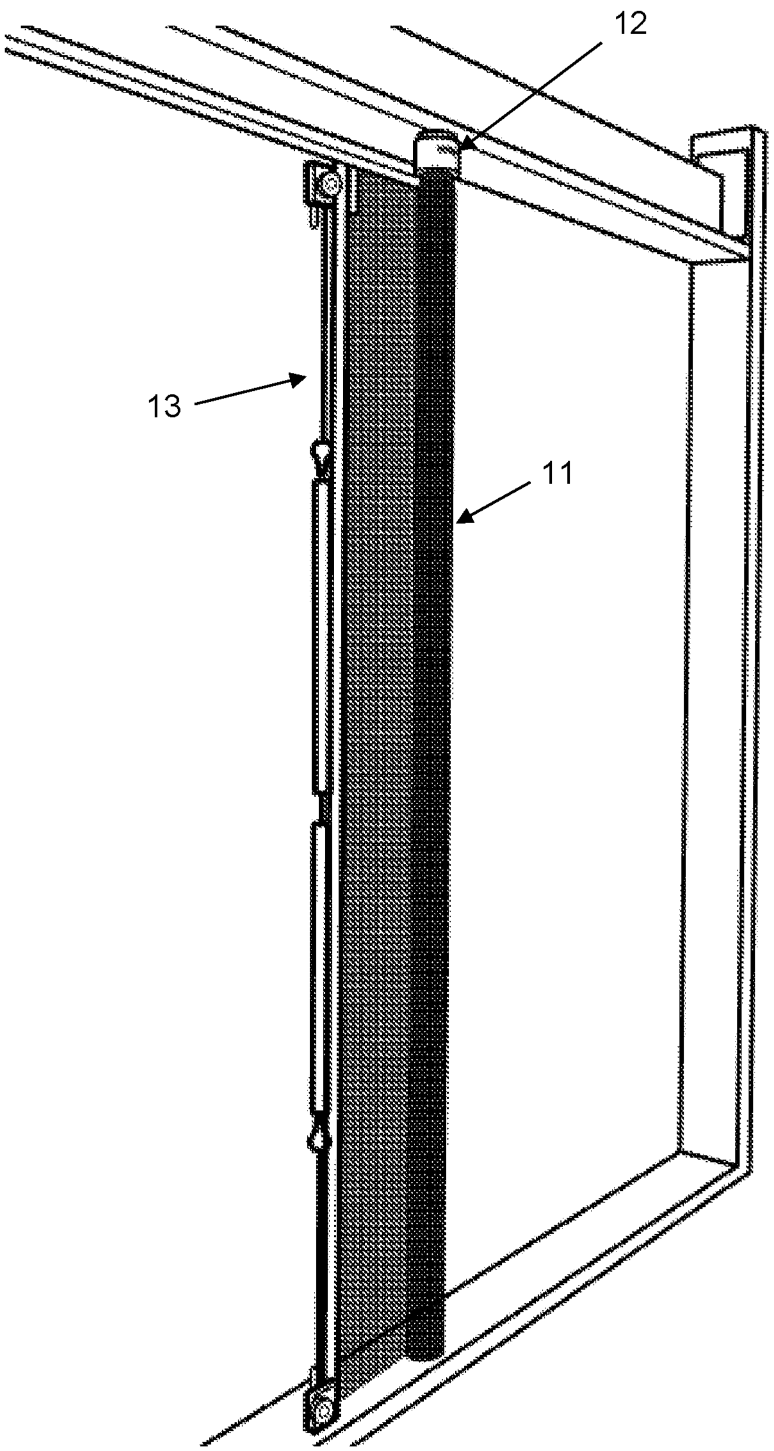
FIG. 5 shows the assembly illustrated in FIG. 1 with the screen in the retracted position.
Figure 6:
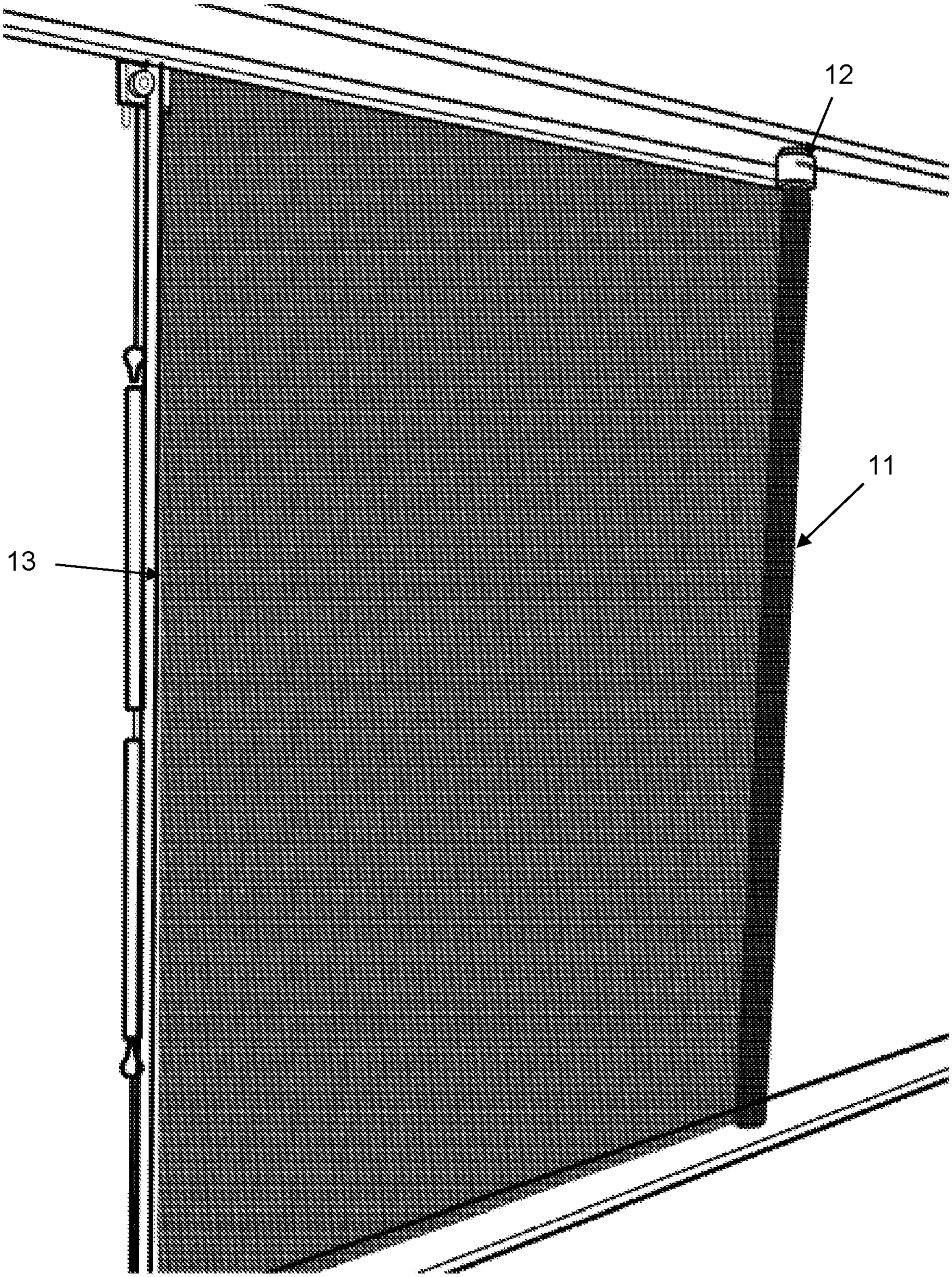
FIG. 6 shows the assembly illustrated in FIG. 1 with the screen in the approximately half extended position.

Referring to FIGS. 1-6, the prior art screen assembly according to the particular embodiment basically comprises the following components: A screen 10, which in the particular embodiment comprises an insect screen, a supporting member 11 about which the screen is wound and unwound, a drum 12 which is positioned in an upper part of the assembly and on top of supporting member 11, a front edge 13 of the screen 10 and which is made of an elongate aluminium section, a biasing spring 14 (the lower portion being visible in FIG. 3, and the upper portion being visible in FIG. 4), the biasing spring 14 being attached to a stile 3 at the front edge 13, a line member which is split into a first line member 15 and a second line member 16 (this will be described in greater detail below), a first return pulley 17 (FIG. 4), a second pulley 18 (FIG. 4), a third return pulley 19 (FIG. 3) and a fourth pulley 20 (FIG. 3).

The present invention includes an attachment assembly 80, a preferred configuration of which is illustrated in FIGS. 8 to 14.

There are many advantages to this arrangement. One advantage is that the screen can be "balanced" at a plurality of positions (and indeed it may be balanced substantially continuously) as the screen is extended and retracted. Another advantage in the particular embodiment is that the biasing spring (in this case springs) is not positioned in the supporting member, but instead can be positioned within or next to the front edge 13.

Screen 10, in the particular embodiment, can be extended between 2-5 m and therefore has this length at least. One end of the screen 10 is attached to the supporting member 11. Supporting member 11 is mounted for rotation about its longitudinal axis such that the screen 10 can be wound and unwound from the supporting member. Importantly, as screen 10 is wound or unwound from the supporting member, the diameter (this being the diameter of the supporting member+any attached screen material) of the supporting member 11 will vary, and will decrease as the screen is unwound and will increase as the screen is wound.

Attached to the top of supporting member 11 is drum 12. In the particular embodiment, drum 12 has a tapered face and is therefore substantially conical. The taper goes from a smaller diameter adjacent the top of the supporting member 11 to a large diameter. It is envisaged that the drum may also be positioned the other way as well. The length of the drum is approximately 3 cm. The widest part of the drum (in the particular embodiment) will be approximately the same diameter as the widest diameter of the supporting member 11+screen 10 (that is when the screen is fully wound on the drum and is completely retracted), and the narrowest part of the drum (in the particular embodiment) will be approximately the same diameter as the diameter of the supporting member+any remaining screen 10 when the screen has been fully extended, and unwound from the drum.

The first line member 15, which in the particular embodiment comprises a plastic-coated steel wire having a diameter of between 1-3 mm, has one end attached to the drum.

Therefore, rotation of the drum will cause line member 15 to wind on to the drum or off the drum as the case may be. In the particular embodiment, and because of the cone shape of the drum, the line member will be laid next to each other on the drum. Thus, the diameter of the drum at the point where the line member is wound onto or off the drum will vary because of the conical shape of the drum.

The first line member 15 extends from drum 12 and extends about first return pulley 17 and then about second pulley 18 and is ultimately attached to the upper part of the biasing spring 14 which in the particular embodiment comprises a spring. Thus, there is tension in the first line member 15. A second line member 16 is also provided which is formed from the same material as first line member 15 and second line member 16 has one end which is joined to first line member (and therefore branches therefrom) in between drum 12 and first return pulley 17. Second line member 16 then also extends about first return pulley 17 but then extends substantially vertically to extend about third pulley 19, then fourth pulley 20 and is attached to the lower end of biasing spring 14. Thus, there is tension in second line member 16.

The biasing spring 14, and second pulley 18 and third pulley 19 are all attached to or relative to the front edge 13 of the screen and therefore move with the screen.

In use, as the screen 10 is extended, the first line member 15 will be wound about and onto drum 12. In the particular embodiment, as the line winds onto the drum the line progressively winds from the larger diameter of the drum to the narrower diameter of the drum and therefore the diameter reduces where the line is wound onto the drum. This can be seen with reference to FIG. 1 and FIG. 2. At the same time, the diameter of the support member 11 containing the wound-up screen material 10 will decrease as the screen material is unwound, and the construction and arrangement is such that the diameter of the drum is about the same at any one point as the diameter of the support member+any remaining screen material. This will also be the case when the screen is retracted as this will cause the diameter of the support member+screen material to increase and at the same time the line member is being unwound from the drum 12 at progressively increasing diameters.

It has been found that this assists in allowing for balancing tension to be applied at all time. The drum 12 enables a constant length of screen to be on a roll (supporting member) at all times thereby largely eliminating the need to allow for a change in length deployed in the system. The use of a spring as opposed to counterweights can reduce the system inertia.

Figure 7:
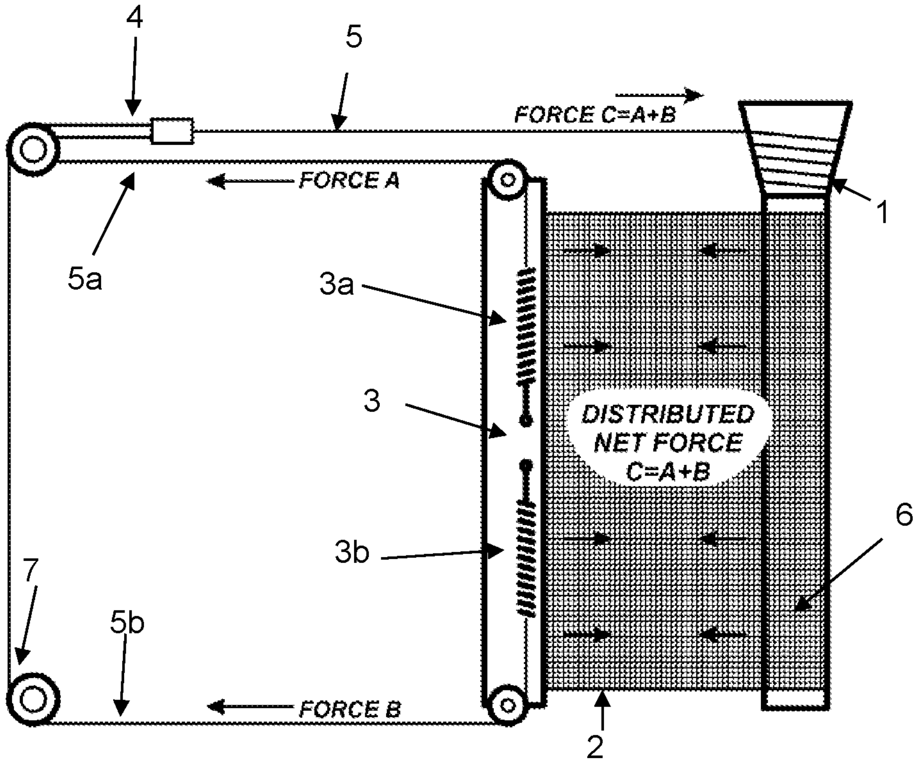
FIG. 7 is a schematic illustration of a screen assembly containing a line member, pulleys, springs as illustrated in FIG. 1 with the forces indicated thereon.
Figure 8:
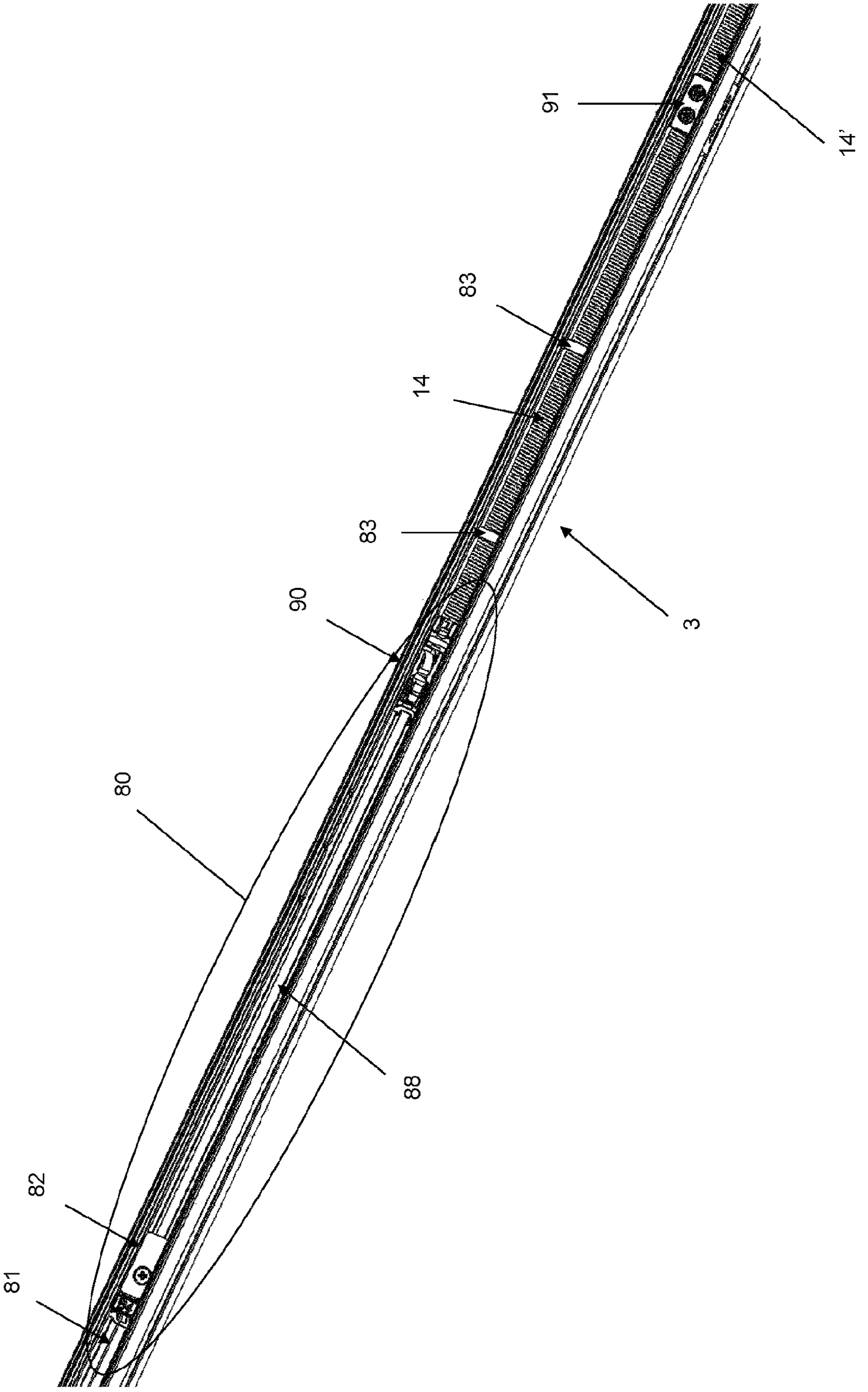
FIG. 8 is an isometric view of a central portion of a stile for a screen assembly according to a preferred embodiment of the present invention.
Figure 9:
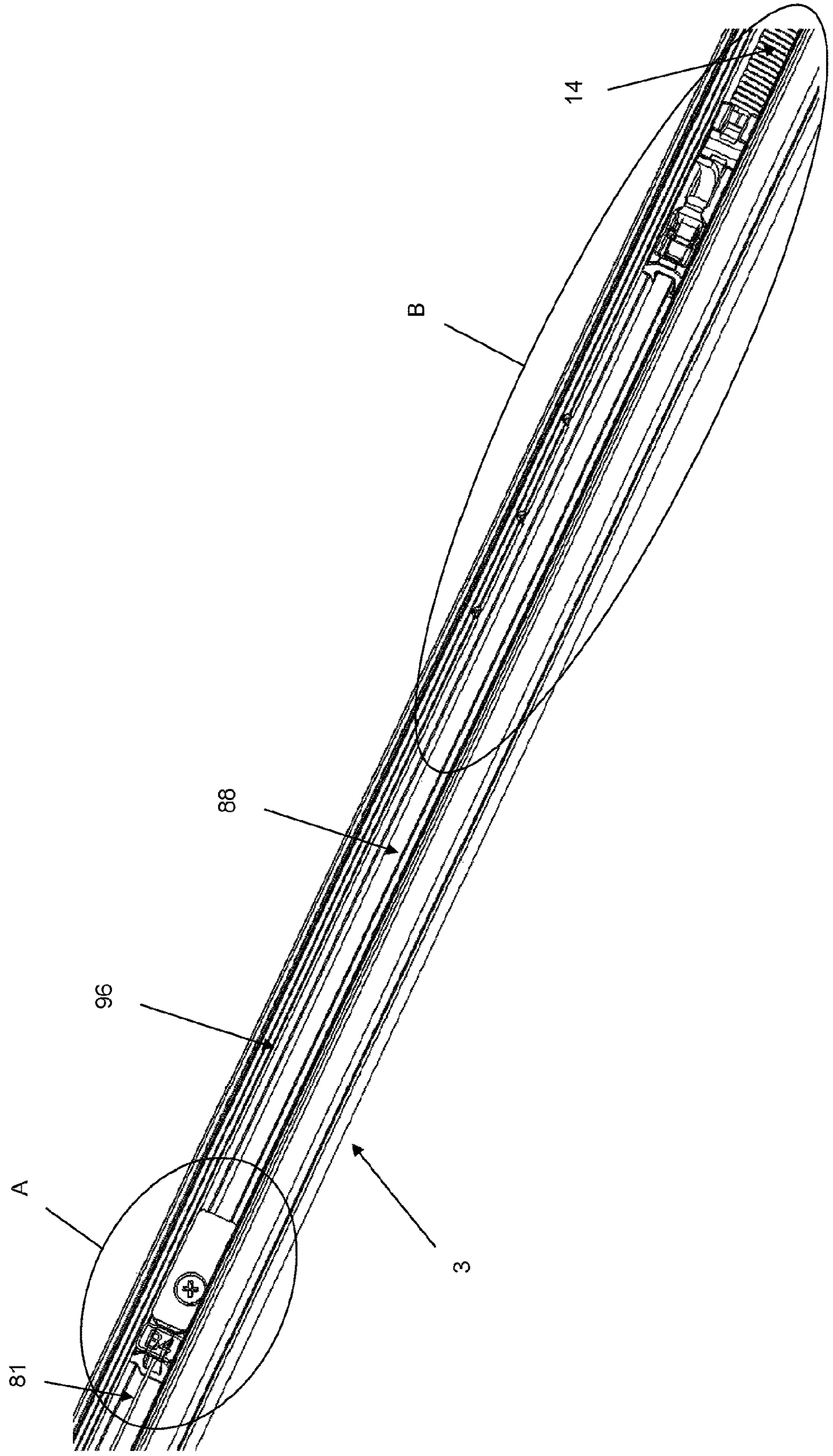
FIG. 9 is a detailed isometric view of the central portion illustrated in FIG. 8.
Figure 10:
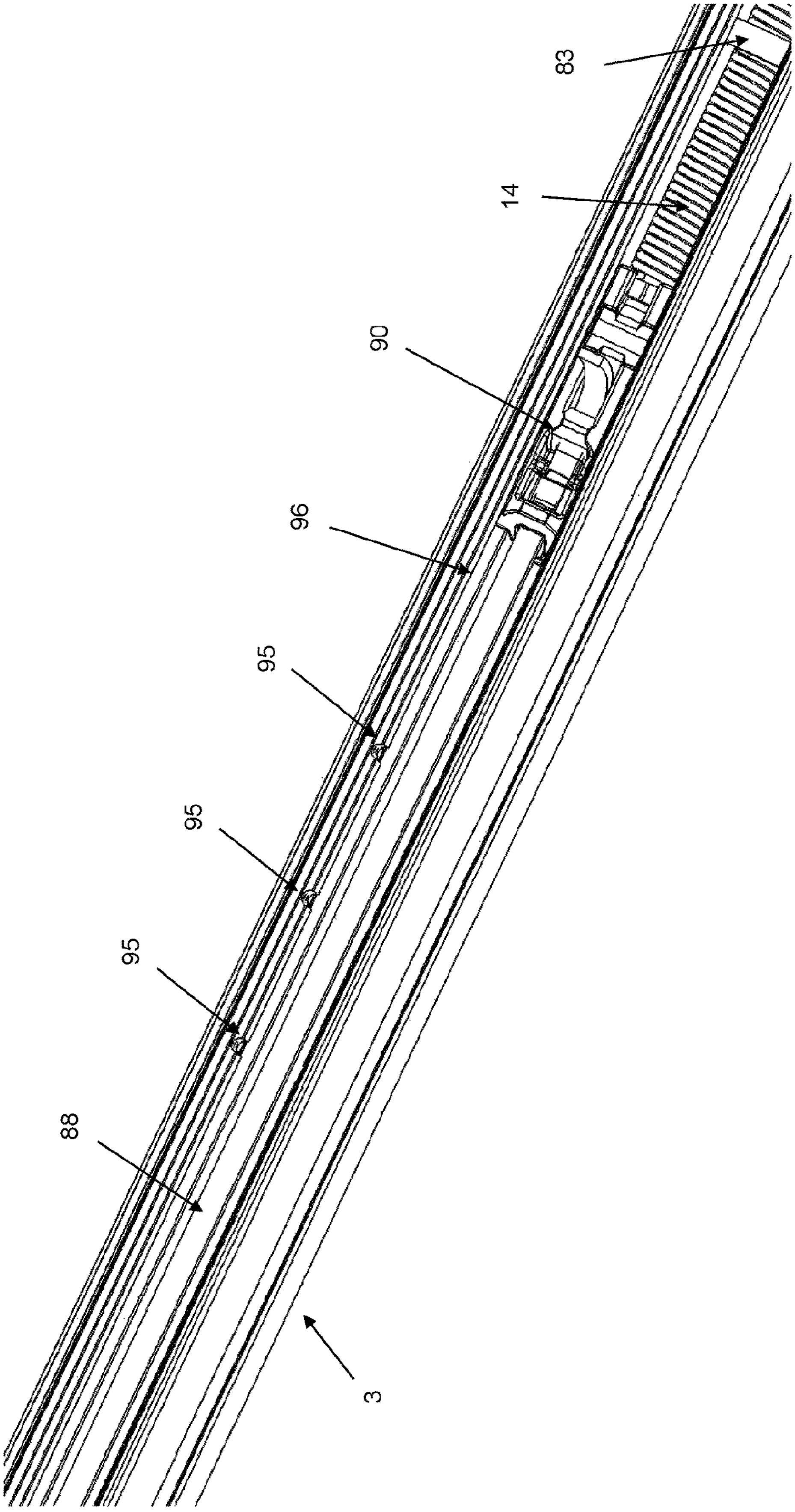
FIG. 10 is an isometric view of the portion illustrated in FIG. 9 identified by reference letter B.
Figure 11:
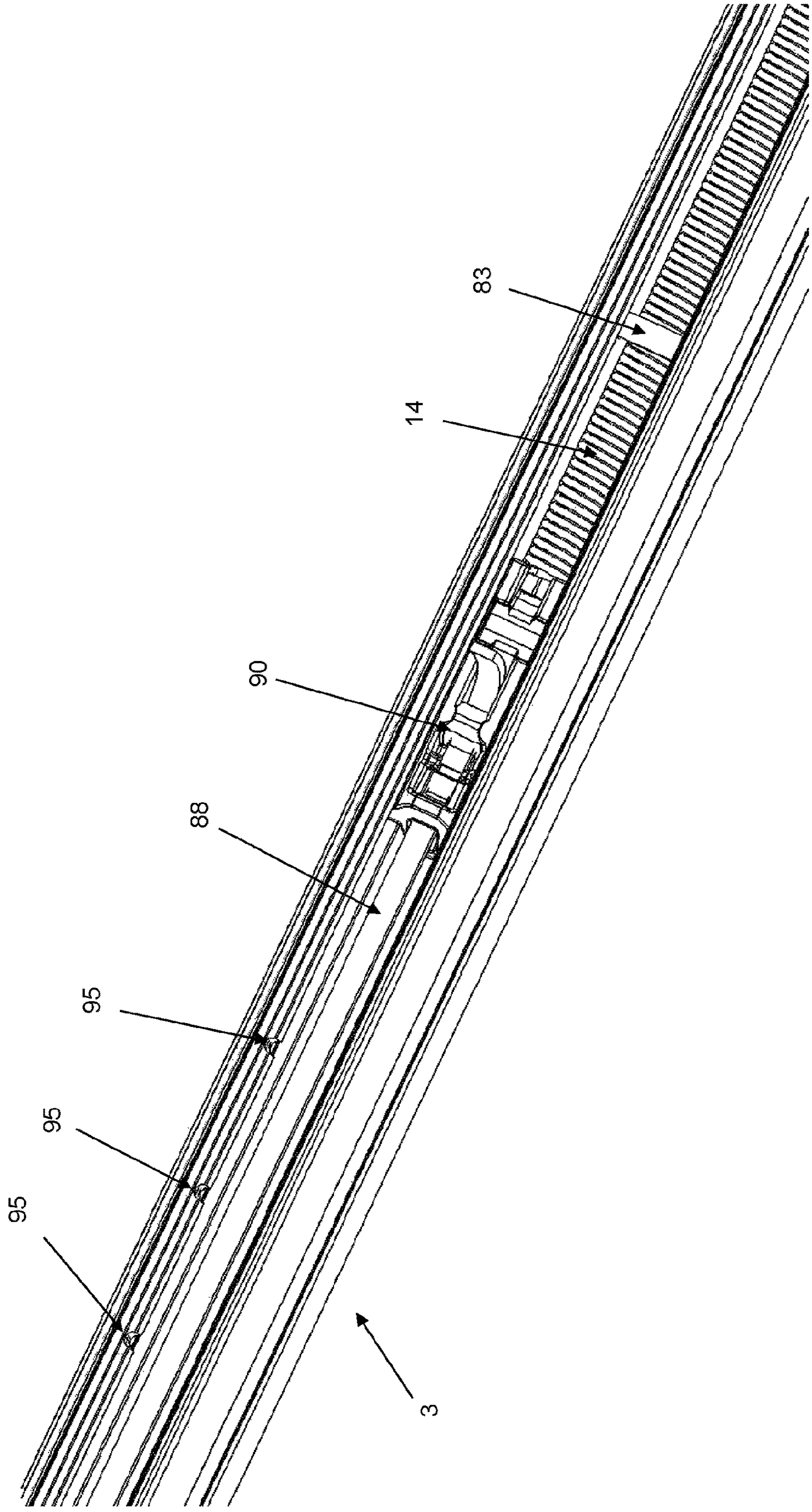
FIG. 11 is a more detailed isometric view of the portion illustrated in FIG. 10.
Figure 12:
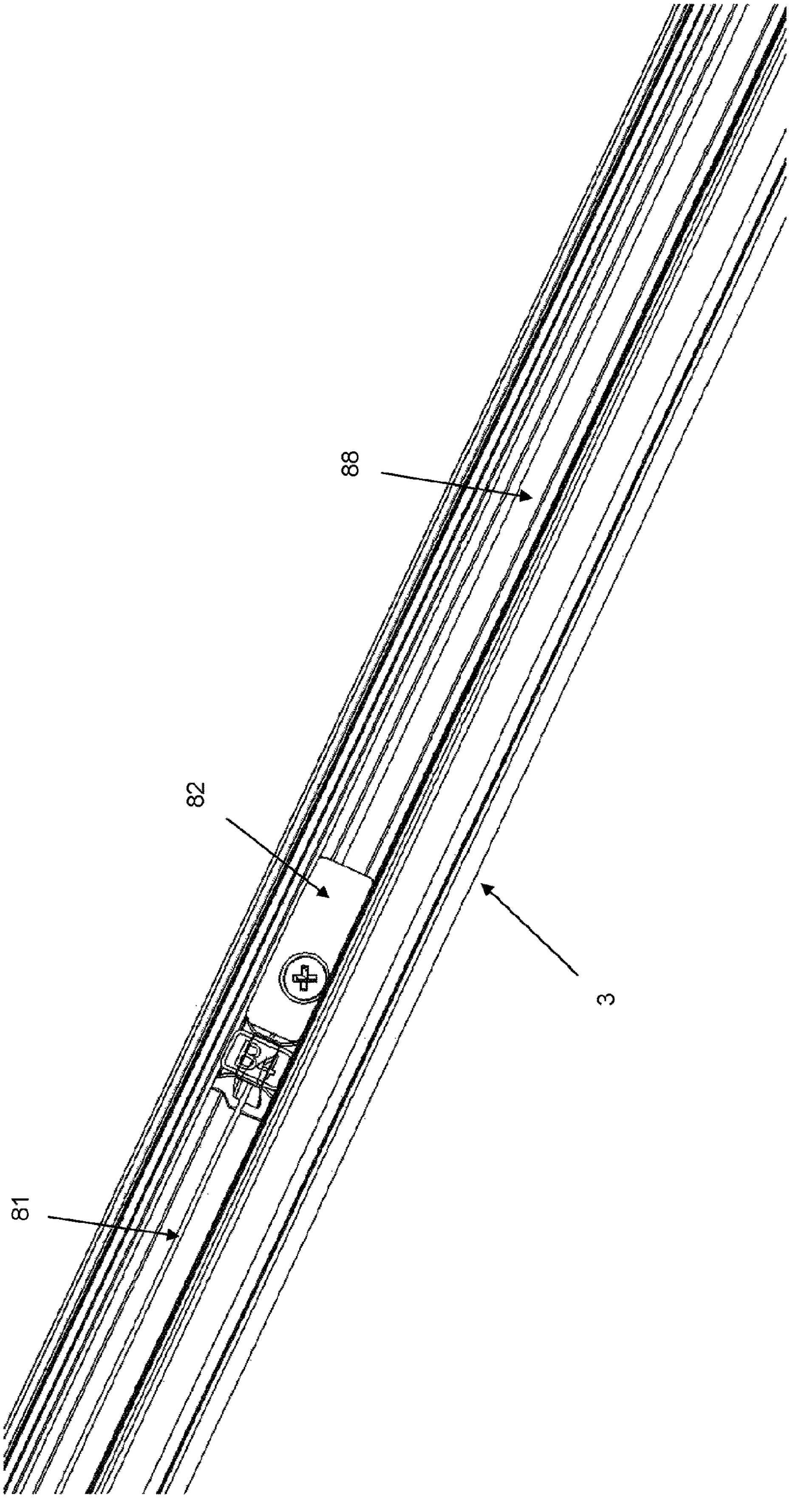
FIG. 12 is an isometric view of the portion illustrated in FIG. 9 identified by reference letter A.

FIG. 7 shows a schematic balanced single unit screen assembly within which the attachment assembly 80 is used. A line member is attached to a biasing member (e.g. a tension spring) contained in either end of the moveable vertical stile, in this embodiment, line member 5*a* is attached to biasing member 3*a*, and line member 5*b* is attached to biasing member 3*b*. The pretension force applied by each extended biasing member (Force A from the top member and Force B from the bottom member) is transferred to the respective line members 5*a* and 5*b*, which are taken around pulleys 7 at one end of the aperture to be screened. These two line members 5*a* and 5*b* are attached to a joiner block 4 and a third line member 5 (or alternatively either 5*a* or 5*b* could extend through the joiner block 4) is attached to the other side of the joiner block. Force C in line member 5 is equal to the combined forces A&B and the other end of this line member 5 is attached to a drum or spooling member which is fixed to the top end of a rod 6 onto which the flexible membrane (2) is rolled.

As the stile 3 is moved away from the rod 6, the flexible membrane is unrolled from the rod 6 and at the same time the line member 5 is wound onto the drum 1. The tension (Force C) in the line member 5 is applied to the drum 1 causing a resultant torque. In a perfectly balanced system, if the effective diameter of drum 1 is equal to the outer diameter of the roll of flexible membrane 2 on the rod 6, then the torque applied by the line member is perfectly balanced by the torque applied by the distributed net force in the flexible membrane 2 and there is no tendency for the system to move in any direction except by the application of an external force applied somewhere in the system (either by a persons hand or foot or by electrically powered device). In this situation, the resultant Force C in the line member 5 is equal to the force (tension) in the flexible membrane 2. In the absence of any external force being applied to the system, friction will overcome the low inertia of the system and the stile 3 will stop moving smoothly after being released.

If the diameters of the drum 1 on which the line member is wound, or the diameter of the roll of the flexible membrane 2 are not matched, then a resultant torque is applied to the rod 6 and then the system will be biased to move in one direction by the release of the potential energy stored in biasing spring 3*a* and 3*b* and the unit will tend to move in one direction—either rolling up onto the rod 6 or further deploying across the aperture towards the pulleys 7 around which the line members 5*a* and 5*b* pass. The direction of movement is determined by the relative diameters. If the effective diameter of the drum 1 is the lesser, then the line member 5 will tend to wind onto it, but if the roll diameter on the rod 6 is lesser, then the flexible membrane 2 will tend to roll onto the rod 6.

An important feature of the screen assembly of the preferred embodiment is an attachment assembly 80, one form of which is illustrated in FIGS. 8 to 14, provided to attach each line member 81 relative to the respective biasing spring 14. The number of attachment assemblies 80 provided in any screen assembly will typically depend upon the configuration of the screen assembly. In a single stile screen assembly with a pair of biasing devices such as that illustrated in FIGS. 8 to 14, a pair of attachment assemblies 80 is provided, one in respect of the upper biasing spring 14 and one in respect of the lower biasing device 14'.

A number of guides or spacers 83 may be provided relative to each biasing spring 14 to maintain the biasing springs 14 in position relative to a channel 96 of the stile 3. In preferred embodiments, the channel 96 is U-shaped, but in other embodiments the channel can have other shapes in which to locate the components as described herein.

Figure 14:
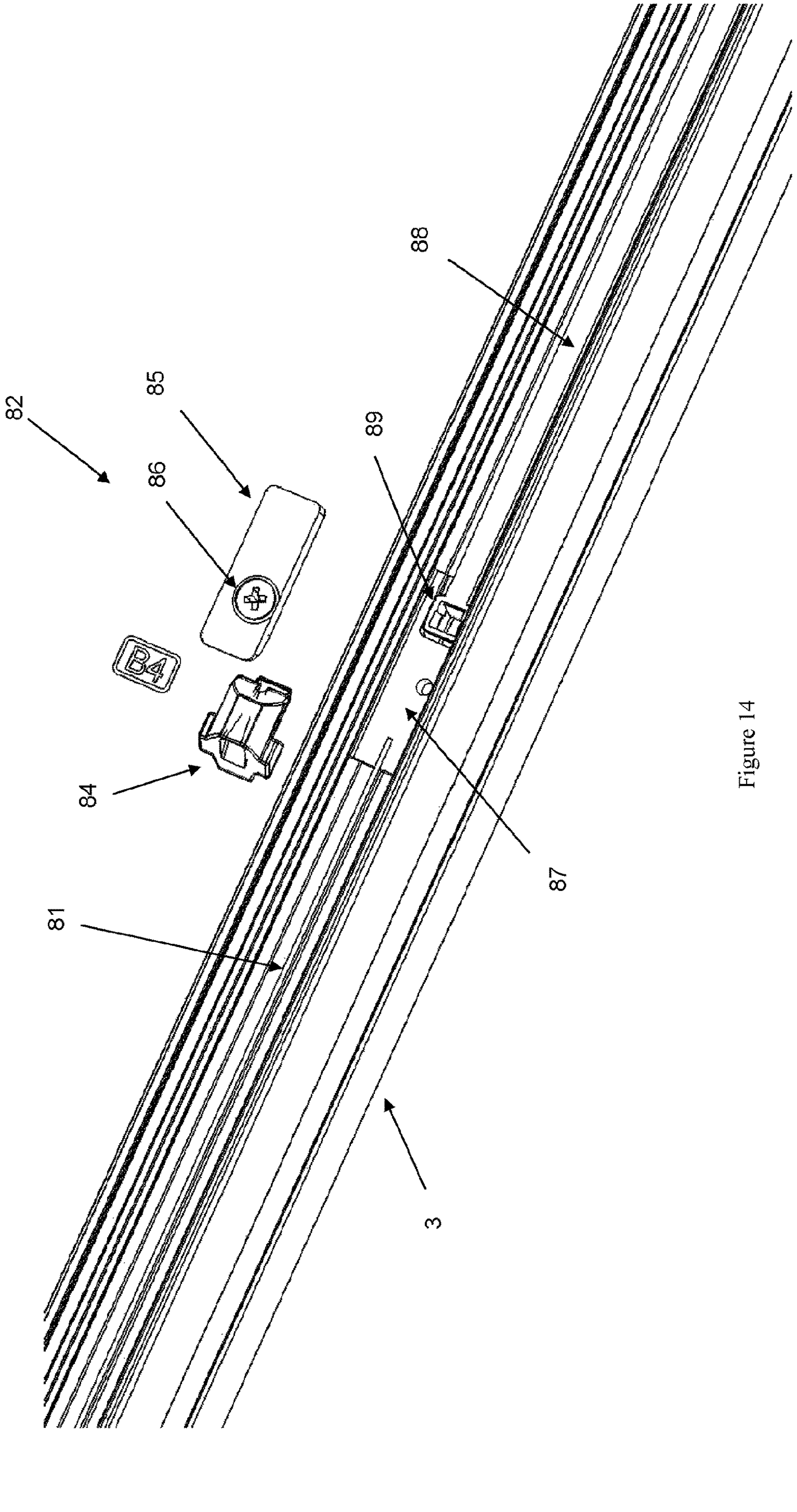
FIG. 14 is an isometric view similar to FIG. 12, but with the line block exploded.

Each attachment assembly 80 includes a line connection device 82 relative to which a portion of the line member 81 is connectable. In the illustrated embodiment, the line connection device 82 is located within the U-shaped channel 96 of the stile 3. As shown in FIG. 14, the line connection device 82 is configured as a body 84 located completely within the U-shaped channel 96 of the stile 3 and a cover 85 which is detachably connected relative to a base plate 87 using a threaded fastener 86. Removal of the cover 85 from the body 84 will typically allow access to the body 84 to attach and detach the line member 81. An appropriate connection mechanism is provided on the body 84 to allow the connection of the line member 81 relative to the line connection device 82. Any connection mechanism may be used for example a crimping mechanism, a clamping mechanism or a pin and slot mechanism or the like. A simple and direct connection mechanism is preferred for ease and speed of assembly.

The elongate connector 88 is preferably mounted relative to the line connection device 82. Again, any connection mechanism can be used to connect the elongate connector 88 to the line connection device 82. In the illustrated preferred form, the elongate connector 88 is provided with an enlarged portion 89 which is received in or relative to a corresponding receiving portion of the line connection device 82 allowing the elongate connector 88 to extend toward a slide block 90 of the attachment assembly 80. Attachment of the cover 85 relative to the body 84 of the line connection device 82 will typically sandwich the enlarged portion 89, fixing its position relative to the line connection device 82. This relatively simple connection mechanism will allow removal and/or replacement of the elongate connector 88 if necessary.

The line connection device 82 may be made of any material and typically a light metal or engineering plastic will be used.

The line connection device 82 may be mounted relative to the stile 3 movably or be fixed in position. If the line connection device 82 is movably mounted, it is preferred that only linear movement is possible relative to the U-shaped channel 96 of the stile 3.

The attachment assembly 80 of the illustrated embodiment includes the slide block 90 operatively associated with each biasing spring 14 and having a tensioning assembly. If the slide block 90 is movably mounted relatively to the stile 3, which is preferred, it is preferred that only linear movement is possible relative to the stile 3 and all other movement restricted or substantially prevented. In the illustrated preferred configuration, the slide block 90 is mounted for movement relative to the stile 3 and movement of the slide block 90 acts to extend or allow retraction of the biasing spring 14 relative to which the slide block 90 is mounted.

In the illustrated embodiment, each slide block 90 is operatively associated with a respective biasing spring 14, with the biasing spring 14 being attached to or relative to the slide block 90. Typically, an outer end of the slide block 90 (the top end of the upper biasing device or the lower end of the lower biasing device respectively) is attached directly to a respective slide block 90 with the other end of the biasing spring attached to the centre block 91.

The biasing springs 14, 14' are provided substantially coaxially relative to the stile 3 and mounted end to end, either side of the centre block 91, typically completely within the U-shaped channel 96 provided in the stile 3. The biasing springs 14, 14' are preferably mounted independently of one another, with the mount of each of the biasing springs 14, 14' able to be moved within the stile 3 in order to individually adjust the tension which the biasing springs 14, 14' exert.

Figure 13:
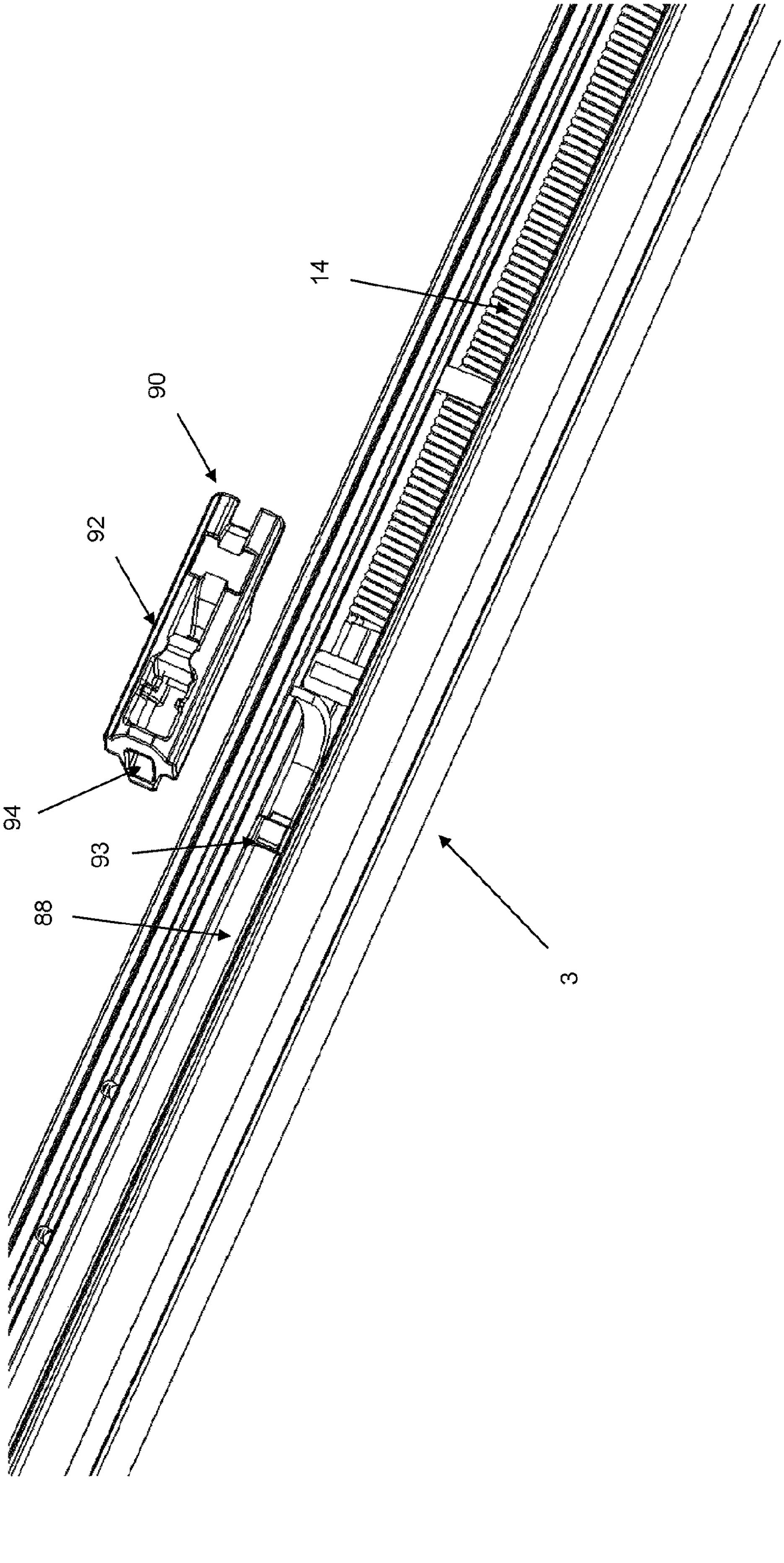
FIG. 13 is an isometric view similar to FIG. 11, but with the slide exploded.

In the configuration illustrated in detail in FIG. 13, each slide block 90 has a body 92 allowing attachment of the biasing spring 14 relative thereto and which also allows the engagement of the elongate connector 88 through provision of the elongate connector engagement head 93.

In the illustrated configuration, the elongate connector engagement head 93 is located at least partially within the body 92 of the slide block 90 in order to be located completely within the U-shaped channel 96 of the stile 3.

The body 92 of the slide block 90 is preferably generally rectangular having an opening 94 provided at one end facing the line connection device 82, through which the elongate connector 88 is fed during attachment of the elongate connector 88 to the slide block 90. Preferably, the opening 94 is provided adjacent to the elongate connector engagement head 93.

The elongate connector engagement head 93 is provided with an engagement shoulder which is biased into engagement with an elongate connector 88 when the elongate connector 88 is inserted into the engagement head 93. This biasing can be achieved in many ways, but one simple way is to provide the engagement shoulder extending into an opening through which the elongate connector 88 is inserted such that the engagement shoulder is depressed or moved by the dimension of the elongate connector 88 as the elongate connector 88 is inserted.

The engagement shoulder is provided in such a way that the engagement shoulder may be released against the bias through an application of force. The force can be applied to move the engagement shoulder either manually and/or using a tool, either directly or indirectly. In this way, the engagement shoulder can typically be released from the elongate connector 88 to allow removal or release of the elongate connector 88 from the engagement head 93 allowing the elongate connector 88 to move in a forward direction to be engaged by the engagement shoulder but also allowing movement of the elongate connector 88 in the reverse direction once the engagement shoulder has been disengaged.

In a preferred form, the engagement shoulder is formed at the apex of a pair of walls which are angled relative to one another. Preferably the engagement shoulder extends across the width of the elongate connector 88 or at least the width of the engagement formations provided on the elongate connector 88.

In use, the engagement between the slide block 90 and the elongate connector 88 will create the tensioning assembly, allowing a user to exert tension on the flexible screen 10 via the line member 81 and the biasing spring 14 associated with the slide block 90.

The elongate connector 88 will of course be elongate and in the preferred form, include a substantially planar portion to engage with the engagement head 93. It is preferred that the elongate connector 88 is flexible but preferably not be resilient.

The elongate connector 88 of the preferred configuration has a plurality of engagement formations to engage with the engagement head 93. Preferably as the elongate connector 88 is drawn through the engagement head 93, the engagement shoulder will engage respective engagement formations to exert or adjust the tension in the flexible screen 10.

Although the engagement formations may have any form, is preferred that the engagement formations be or include a number of spaced apart ridges with which the engagement shoulder can engage as required. The spaced apart ridges are typically spaced over at least a portion of the length of the elongate connector 88.

A gripping portion may be provided at the forward end of the elongate connector. A forward end of the elongate connector may be tapered in order to ease insertion or alignment of the elongate connector with the engagement head. An opening may be provided in the forward end of the elongate connector to allow a user to insert a finger for example to pull the elongate connector through the engagement head.

The elongate connector is provided with one or more alignment markings or configurations.

A number of corresponding alignment indentations 95 are provided on the stile 3. The alignment indentations 95 provided on stile 3 are used with alignment markings or configurations provided on the elongate connector 88 during the pre-tensioning step during assembly.

The assembly method includes pre-tensioning the line member 81 before attachment to the line connection device 82 to remove any slack, attaching the line member 81 to the line connection device 82, engaging the elongate connector 88 with the slide block 90 to take up any slack in the line member 81, working the flexible screen 10 to wind and unwind the line member 81 a number of times and adjusting the final tension of the line member 81 by moving the elongate connector 88 relative to the slide block 90 if necessary.

Once set, the flexible screen will remain balanced although some adjustment (typically tightening) can be undertaken as and when necessary using the attachment assembly 80.

In the present specification and claims (if any), the word 'comprising' and its derivatives including 'comprises' and 'comprise' include each of the stated integers, but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

The invention claimed is:

1. A pull across roll up screen assembly comprising:

a. at least one flexible screen having a stile located at a front edge area of the flexible screen, b. a substantially vertical supporting member about which the flexible screen can be wound/unwound and having an upper end and a lower end, c. at least one biasing device within the stile to create a tension in the flexible screen, d. at least one drum associated with the supporting member, e. a line member that can be wound onto and off the drum, the line member being operatively associated with the stile such that as the flexible screen is extended, the line member is wound onto the drum, and as the flexible screen is retracted, the line member is wound off the drum, the line member being operatively associated with the at least one biasing device using an attachment assembly including:

i. a line connection device relative to which a portion of the line member is connectable, the line connection device located within a U-shaped channel of the stile;

ii. a slide block operatively connected with the at least one biasing device and having a tensioning assembly; and iii. an elongate connector mounted relative to the line connection device and configured for selective engagement with the slide block to create the tensioning assembly to tension the line member and thereby tension the flexible screen.

2. The screen assembly of claim 1, wherein the at least one flexible screen is a mesh screen or an opaque screen or a combination of a mesh screen and an opaque screen.

3. The screen assembly of claim 1, wherein the at least one flexible screen is:

non-resilient; and/or manufactured from a fabric or polymeric sheet of material; and/or attached to, or attached relative to the supporting member at an opposite edge area of the at least one flexible screen.

4. The screen assembly of claim 1, comprising a plurality of flexible screens, wherein at least one of the plurality of flexible screens extends from both sides of the assembly towards the middle, or another point, and/or wherein more than one of the plurality of flexible screens extends from the same side of the assembly, but spaced apart so as not to obstruct one another.

5. The screen assembly of claim 1, wherein the substantially vertical supporting member:

is configured as a cylindrical member or roll; and/or is mounted for rotation at the upper end and at the lower end; and/or extends substantially to, or slightly more than a height of the flexible screen member.

6. The screen assembly of claim 1, wherein the stile:

comprises one or more guides provided at an upper end and/or a lower end to guide movement of the stile between the extended and retracted positions; and/or is a rigid member and the U-shaped channel is provided therein to contain components, particularly the components of the attachment assembly.

7. The screen assembly of claim 6, wherein the U-shaped channel:

is provided on a side of the stile which is opposite the supporting member; and/or is provided with a removable cover which is engageable relative to the U-shaped channel.

8. The screen assembly of claim 1, wherein the at least one biasing device comprises a pair of biasing devices for each of the stiles, each of the pair of biasing devices comprising one upper biasing device and one lower biasing device.

9. The screen assembly of claim 8, wherein the biasing devices are:

provided substantially coaxially relative to the stile; and/or mounted end to end; and/or mounted at least partially, and preferably completely within the U-shaped channel provided in the stile; and/or mounted independently of one another.

10. The screen assembly of claim 9, wherein a mount of each of the biasing devices is movable within the stile to adjust the tension which the biasing device exerts.

11. The screen assembly of claim 1, comprising one or more mounting blocks relative to a centre of the stile wherein one end of the at least one biasing device is attached relative to the mounting block.

12. The screen assembly of claim 1, the stile comprising the one or more guides and the rigid member, the one or more guides relative to the or each biasing device to maintain the or each biasing device in position relative to the U-shaped channel of the stile.

13. The screen assembly of claim 1, wherein the drum is provided at an upper end of the substantially vertical supporting member and coaxially therewith for rotation with the supporting member.

14. The screen assembly of claim 1, wherein: a diameter of the drum is about the same as a diameter of the flexible screen about the supporting member; and/or the drum, or part of the drum has a shaped profile, such that as the line member is wound onto, or off the drum, the diameter of the drum at a position where the line member contacts the drum varies; and/or the drum, or part of the drum has one of the following shapes, or a combination thereof: conical; partially conical; diverging cones; converging cones; cylindrical; substantially cylindrical; a "stepped" profile comprising multiple cylinders of different diameters; a tapered cone at either end optionally with a short parallel portion at, or adjacent the center; a "reverse barrel"; tapering from a larger diameter closest to the supporting member, to a smaller diameter further away from the supporting member, or vice versa.

15. The screen assembly of claim 1, comprising a first line member to be wound onto and off the drum and one or more other line members and/or line portions to balance the flexible screen.

16. The screen assembly of claim 15, the at least one biasing device comprises a pair of biasing devices, the first line member is attached at an upper end of an upper biasing device of the pair of biasing devices and the other line member is attached at a lower end of a lower biasing device of the pair of biasing devices.

17. The screen assembly of claim 16, wherein the first line member extends to a joiner block, a second line member extends from the joiner block to the upper biasing device and the other line member extends from the joiner block to the lower biasing device.

18. The screen assembly of claim 17, wherein the line members extend about one or more wheels or pulleys to change direction and be provided about the edge of the flexible screen.

19. The screen assembly of claim 1, comprising a plurality of attachment assemblies, wherein one of the attachment assemblies is operatively associated with one of the biasing devices.

20. The screen assembly of claim 7, wherein the line connection device is configured as a body; and/or wherein the line member is connected to the line connection device by one of the following connection mechanisms; a crimping mechanism; a clamping mechanism; a pin and slot mechanism; and/or wherein the line connection device is mounted relative to the stile in a fixed position or movably, wherein only linear movement is possible relative to the stile.

21. The screen assembly of claim 1, wherein the elongate connector comprises an enlarged portion received in or relative to a corresponding receiving portion of the line connection device allowing the elongate connector to extend toward the slide block of the attachment assembly, wherein attachment of a removable cover of the U-shaped channel of the stile relative to a body of the line connection device sandwiches the enlarged portion, fixing its position relative to the line connection device.

22. The screen assembly of claim 1, wherein the slide block is mounted relative to the stile fixed in position or movably, wherein the slide block is restricted to linear movement relative to the stile, wherein, where the slide block is mounted for movement relative to the stile, preferably, movement of the slide block acts to extend or compress the biasing device relative to which the slide block is mounted.

23. The screen assembly of claim 1, wherein an outer end of the at least one biasing device is attached directly to the slide block, wherein of the slide block preferably has a body allowing attachment of the biasing device relative thereto and attachment or mounting of the elongate connector through an elongate connector engagement head; wherein the elongate connector engagement head is preferably located at least partially within the body of the slide block to be located completely within the U-shaped channel of the stile.

24. The screen assembly of claim 1, wherein a body of the slide block:

is generally rectangular; and/or comprises an opening provided at one end facing the line connection device, the opening through which the elongate connector is fed during attachment of the elongate connector to the slide block, wherein the opening is preferably adjacent the elongate connector engagement head.

25. The screen assembly of claim 23, wherein the elongate connector engagement head comprises at least one engagement shoulder, wherein the engagement shoulder is biased into engagement with the elongate connector when the elongate connector is inserted into the engagement head; and/or extends into an opening through which the elongate connector is inserted such that the engagement shoulder is depressed or moved by the dimension of the elongate connector as the elongate connector is inserted; and/or is provided in such a way that the engagement shoulder is released against the bias through an application of force to allow removal or release of the elongate connector from the engagement head allowing the elongate connector to move in a forward direction to be engaged by the engagement shoulder and allowing movement of the elongate connector in the reverse direction once the engagement shoulder has been disengaged; and/or is formed at the apex of a pair of walls which are angled relative to one another; and/or extends across the width of the elongate connector, or at least the width of engagement formations provided on the elongate connector.

26. The screen assembly of claim 25, wherein engagement between the slide block and the elongate connector creates the tensioning assembly allowing a user to exert tension on the flexible screen via the line member and the biasing device associated with the slide block.

27. The screen assembly of claim 23, wherein the elongate connector:

comprises a substantially planar portion to engage with the engagement head; and/or is flexible; and/or is not resilient, or has limited resiliency to provide a buffering effect, whilst maintaining tension in the flexible screen.

28. The screen assembly of claim 25, wherein the engagement formations of the elongate connector:

are engaged by the engagement shoulder, as the elongate connector is drawn through the engagement head, to exert or adjust the tension in the flexible screen; and/or are, or include a number of spaced apart ridges, spaced over at least a portion of the length of the elongate connector, with which the engagement shoulder can engage.

29. The screen assembly of claim 23, wherein a forward end of the elongate connector:

comprises a gripping portion; and/or
is tapered in order to ease insertion or alignment of the elongate connector with the engagement head; and/or
comprises an opening to allow a user to insert a finger or tool to pull the elongate connector through the engagement head.

30. The screen assembly of claim 1, wherein the elongate connector comprises one or more alignment markings or configurations and the stile comprises one or more corresponding alignment markings or configurations, preferably in the form of indentations or similar.

31. An attachment assembly for a pull across roll up screen assembly, the attachment assembly comprising:
a line connection device configured for connection with a portion of a line member of the screen assembly, the line connection device located within a U-shaped channel of a vertical stile located at a front edge area of at least one flexible screen and a vertical support member about which the flexible screen can be wound/unwound and having an upper end and a lower end;
a slide block operatively connected with at least one biasing device of the screen assembly; and
an elongate connector mounted relative to the line connection device and configured for selective engagement with the slide block to tension the line member and thereby tension the at least one flexible screen of the screen assembly.

32. A method for assembling a pull across roll up screen assembly comprising:
a. a flexible screen having a stile located at a front edge area of the flexible screen,
b. a substantially vertical supporting member about which the flexible screen can be wound/unwound and having an upper end and a lower end,
c. at least one biasing device within the stile to create a tension in the flexible screen,
d. at least one drum associated with the supporting member,
e. a line member that can be wound onto and off the drum, the line member being operatively associated with the stile such that as the flexible screen is extended, the line member is wound onto the drum, and as the flexible screen is retracted, the line member is wound off the drum, the line member being operatively associated with the at least one biasing device using an attachment assembly including:
i. a line connection device relative to which a portion of the line member is connectable, the line connection device located within a U-shaped channel of the stile;
ii. a slide block operatively connected with the at least one biasing device and having a tensioning assembly; and
iii. an elongate connector mounted relative to the line connection device and configured for selective engagement with the slide block to tension the line member and thereby tension the flexible screen;

the method including the steps of pre-tensioning the line member before attachment to the line connection device, attaching the line member to the line connection device, engaging the elongate connector with the slide block to take up any slack in the line member, working the flexible screen to wind and unwind the line member a number of times and adjusting the final tension of the line member by moving the elongate connector relative to the tensioning assembly of the slide block if necessary.

* * * * *